No. 729,616. PATENTED JUNE 2, 1903.
E. A. LEWIS.
EYEGLASSES.
APPLICATION FILED JULY 3, 1902.
NO MODEL.

Witnesses.
H. T. S. Young
L. Trimble

Inventor.
E. A. Lewis

No. 729,616. Patented June 2, 1903.

UNITED STATES PATENT OFFICE.

ERNEST ALFRED LEWIS, OF TORONTO, CANADA.

EYEGLASSES.

SPECIFICATION forming part of Letters Patent No. 729,616, dated June 2, 1903.

Application filed July 3, 1902. Serial No. 114,275. (No model.)

*To all whom it may concern:*

Be it known that I, ERNEST ALFRED LEWIS, of the city of Toronto, in the county of York, in the province of Ontario, Canada, have invented certain new and useful Improvements in Eyeglasses, of which the following is a specification.

My invention relates to improvements in eyeglasses; and the object of the invention is to devise a simple and cheap form of bridge of a maximum resiliency in all directions, which may be readily attached to the posts of the nose-pieces, in which the connection to such nose-pieces will be practically invisible when the glasses are placed on the nose, and in which the resiliency will be such that the nose-pieces will grip and hold firmly on the nose without any appreciable pressure; and it consists, essentially, of a wire bent to form a bridge so that such bridge is practically at right angles to the plane of the lenses of the glasses and the ends of the bridge extend inwardly behind the lenses of the glasses in the form of coiled springs behind the point where they are attached to the posts of the nose-pieces, the parts being otherwise arranged and constructed in detail, as hereinafter more particularly explained.

Figure 1:
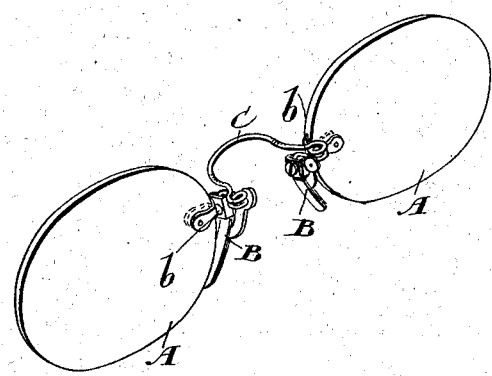
Figure 2:
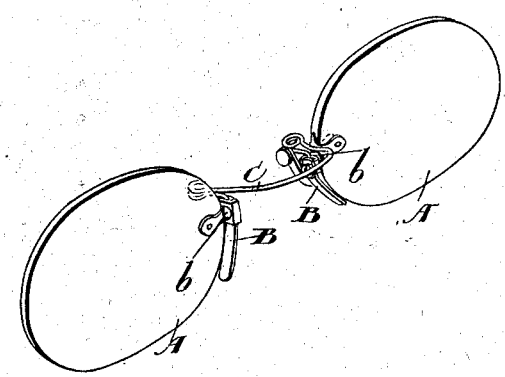
Figure 3:
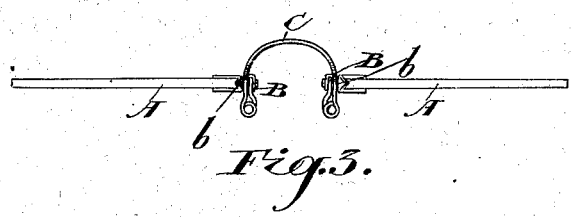

Figure 1 is a perspective rear view of the eyeglasses with the bridge constructed in accordance with my invention. Fig. 2 is a perspective view from the front to exemplify the substantial invisibility of the connection to the nose-piece. Fig. 3 is a plan view.
In the drawings like letters of reference indicate corresponding parts in each figure.

A A are the lenses of a pair of eyeglasses.

B B are the nose-pieces, which are secured in the usual way by the posts *b b* to the inside ends of the lenses.

C is a slender wire bridge which is substantially U shape in form and is arranged so that the bridge is in a plane at right angles to the plane of the lenses. The ends of the bridge are screwed or suitably fastened in the top of the nose-pieces and extend inwardly in the form, preferably, of a double coil at each side behind the posts and nose-pieces and then forwardly beyond the nose-pieces to form the bridge, such bridge extending for the most part to the front of the faces of the lenses of the eyeglasses.

In this specification I do not wish to lay claim, broadly, to the forming of a bridge with coiled springs at or near the ends, as this is old.

What I claim as my invention is—

1. An eyeglass comprising the lenses, the posts connected thereto, the downwardly-extending nose-pieces having their upper ends secured to recesses in the inner faces of the posts, and a horizontally-disposed bridge-piece comprising a single piece of spring-wire having a substantially U-shaped central portion with coils at each end thereof and end portions extending from the coils toward the posts and having downwardly-turned ends seated in openings in the upper ends of the posts, substantially as described.

2. An eyeglass comprising the lenses, the posts connected thereto, the nose-pieces connected to the posts and a horizontally-disposed bridge-piece comprising a single piece of spring-wire having a U-shaped central portion, the ends of which extend to the back of the lenses and have formed at this point the intermediately horizontally disposed coils, the ends of the wire passing forwardly from such coils parallel to the sides of the U into the posts at points on a line with the lenses as specified.

ERNEST ALFRED LEWIS.

Witnesses:
B. BOYD,
R. SHIELDS.